(12) United States Patent
Ikeda et al.

(10) Patent No.: US 10,449,841 B2
(45) Date of Patent: Oct. 22, 2019

(54) VEHICLE BACK DOOR

(71) Applicant: TOYOTA JIDOSHA KABUSHIKI KAISHA, Toyota-shi, Aichi-ken (JP)

(72) Inventors: Koki Ikeda, Toyota (JP); Tatsuya Ayukawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 611 days.

(21) Appl. No.: 15/018,657

(22) Filed: Feb. 8, 2016

(65) Prior Publication Data

US 2016/0236723 A1 Aug. 18, 2016

(30) Foreign Application Priority Data

Feb. 12, 2015 (JP) ................................. 2015-025442

(51) Int. Cl.

| B60J 5/10 | (2006.01) |
| B60J 5/04 | (2006.01) |
| B32B 3/08 | (2006.01) |
| B32B 3/26 | (2006.01) |
| B32B 27/08 | (2006.01) |
| B60J 1/18 | (2006.01) |
| B62D 25/08 | (2006.01) |
| B62D 29/04 | (2006.01) |

(52) U.S. Cl.
CPC ................. *B60J 5/107* (2013.01); *B32B 3/08* (2013.01); *B32B 3/266* (2013.01); *B32B 27/08* (2013.01); *B60J 1/18* (2013.01); *B60J 5/0461* (2013.01); *B62D 25/08* (2013.01); *B62D 29/043* (2013.01); *B32B 2605/08* (2013.01); *B60J 5/0431* (2013.01); *B60J 5/0433* (2013.01)

(58) Field of Classification Search
CPC ....... B60J 1/18; B60J 5/107; B60J 5/10; B60J 5/0461
See application file for complete search history.

(56) References Cited

U.S. PATENT DOCUMENTS

| 2006/0191206 A1 | 8/2006 | Mooney et al. |
| 2007/0145768 A1 | 6/2007 | Saitoh et al. |
| 2007/0145773 A1* | 6/2007 | Saitoh ..................... B60J 5/101 296/146.8 |

(Continued)

FOREIGN PATENT DOCUMENTS

| CN | 1991125 A | 7/2007 |
| DE | 19519509 A1 | 12/1995 |

(Continued)

*Primary Examiner* — Gregory J Strimbu
(74) *Attorney, Agent, or Firm* — Oliff PLC

(57) ABSTRACT

A vehicle back door main body includes (1) an outer upper panel made of carbon-fiber-reinforced-plastic that is joined to an upper portion of an inner panel made of carbon-fiber-reinforced-plastic, and (2) an outer lower panel made of a resin that is weaker than the carbon-fiber-reinforced-plastic and that is joined to a lower portion of the inner panel. A first portion of the inner panel is reinforced by the outer upper panel. A second portion of the inner panel has a lower strength than the first portion. A boundary between the first and second portions, at which there is a strength difference, is located adjacent to a small window opening in the vehicle back door.

13 Claims, 11 Drawing Sheets

(56) References Cited

U.S. PATENT DOCUMENTS

| | | | |
|---|---|---|---|
| 2010/0102589 A1* | 4/2010 | Miyake | B60J 5/107 296/146.8 |
| 2010/0102590 A1* | 4/2010 | Miyake | B60J 5/101 296/146.8 |
| 2011/0074179 A1 | 3/2011 | Kuntze et al. | |
| 2012/0139288 A1* | 6/2012 | Ohki | B60J 1/18 296/146.15 |
| 2012/0248814 A1 | 10/2012 | Tsukiyama et al. | |
| 2012/0280533 A1* | 11/2012 | Gachter | B60J 5/101 296/146.8 |
| 2014/0210230 A1 | 7/2014 | Iwano | |

FOREIGN PATENT DOCUMENTS

| | | |
|---|---|---|
| DE | 102012003599 A1 | 10/2012 |
| EP | 1803594 A1 | 7/2007 |
| EP | 2765016 A1 | 8/2014 |
| JP | 4-123813 * | 11/1992 |
| JP | 2004-330962 A | 11/2004 |
| JP | 2007-176360 A | 7/2007 |
| JP | 2007-313919 A | 12/2007 |
| JP | 2010-247676 A | 11/2010 |
| JP | 2010-260519 A | 11/2010 |
| JP | 2011-057188 A | 3/2011 |
| JP | 2013-082235 A | 5/2013 |
| JP | 2014-076707 A | 5/2014 |
| JP | 2014-131896 A | 7/2014 |

* cited by examiner

VEHICLE BACK DOOR

INCORPORATION BY REFERENCE

The disclosure of Japanese Patent Application No. 2015-025442 filed on Feb. 12, 2015 including the specification, drawings and abstract is incorporated herein by reference in its entirety.

BACKGROUND

1. Technical Field

The disclosure relates to a vehicle exterior design member in which an inner panel and an outer panel are made of resin.

2. Description of Related Art

Japanese Patent Application Publication No. 2007-313919 (JP 2007-313919 A) describes a resin panel that is used as an exterior design member and an interior design member of a vehicle. This resin panel is a molded article of fiber mat in which fiber material and binder resin are mixed together. A weak portion having a weaker fracture strength than other portions in the surface direction is provided by making the composite material of the fiber material different in one part. As a result, the fracture mode (deformation mode) of the resin panel when a collision occurs, for example, is stabilized.

However, with the resin panel described above, the composite material must be made different in one part, so manufacturing is complex. Also, the exterior design member for a vehicle is formed by joining together a plurality of panels formed in predetermined shapes, so the member formed by the plurality of panels being joined together needs to have a stabilized deformation mode.

SUMMARY

The disclosed embodiments thus provide a vehicle exterior design member and a vehicle back door that contributes to the stabilization of the deformation mode, in a structure in which an inner panel made of resin and an outer panel made of resin are joined together.

A first aspect relates to a vehicle exterior design member comprising: an inner panel made of resin; an outer panel made of resin and that is joined to the inner panel to form the vehicle exterior design member, at least one of the inner panel and the outer panel having an opening or a weak portion that is weaker than a remainder of the at least one of the inner and outer panels; a reinforcing member provided at a first outer edge portion of the vehicle exterior design member; and a second outer edge portion of the vehicle exterior design member, the second outer edge portion having a lower strength than the first outer edge portion. The opening or the weak portion is arranged adjacent to a boundary portion between the first outer edge portion and the second outer edge portion.

With this vehicle exterior design member, an opening or weak portion is provided in or on at least one of the panels of a vehicle exterior design member in which an inner panel made of resin and an outer panel made of resin are joined together. A portion of an outer edge portion of this vehicle exterior design member is a first outer edge portion, and another portion of the outer edge portion of the vehicle exterior design member is a second outer edge portion. The first outer edge portion is reinforced by a reinforcing member, and has a higher strength than the second outer edge portion. Also, the boundary portion between the first outer edge portion and the second outer edge portion is arranged adjacent to the opening or the weak portion. That is, the boundary portion between the first outer edge portion and the second outer edge portion where there is a strength difference is weakened by being adjacent to the opening or the weak portion. As a result, when a collision or the like occurs, the vehicle exterior design member tends to deform at or near this boundary portion, which contributes to the stabilization of the deformation mode.

The term "arranged adjacent" as used in this description means, for example, that the boundary portion and the opening or weak portion are arranged such that when the vehicle exterior design member deforms at or near the boundary portion as described above, this deformation location reaches (extends) to at least the opening or the weak portion.

The reinforcing member may be an outer edge outer panel made of resin, and the first outer edge portion may include an enclosed chamber formed by the outer edge outer panel joined to an outer edge portion of the inner panel.

With this vehicle exterior design member, the first outer edge portion includes an enclosed chamber formed by the resin outer edge outer panel that is a reinforcing member being joined to the outer edge portion of the resin inner panel. As a result, weight is able to be reduced compared to when a metal reinforcement or the like is used as a reinforcing member.

The outer edge portion of the inner panel can include an open sectional portion having an open sectional shape, and the enclosed chamber may be formed by the outer edge outer panel and a portion of the open sectional portion.

With this vehicle exterior design member, the enclosed chamber of the first outer edge portion is provided by the outer edge outer panel and the portion of the open sectional portion provided on the outer edge portion of the inner panel. Having the open sectional portion provided on the outer edge portion of the inner panel in this way enables the strength of the inner panel to be increased, so the strength of the vehicle exterior design member is able to be ensured mainly by the inner panel. Consequently, the degree of freedom in design of the outer panel is able to be improved.

The term "open sectional shape" as used in this description refers to, for example, a shape in which a portion of a cross-section is open, such as a hat-shaped sectional shape, a generally U-shaped sectional shape, a generally C-shaped sectional shape, or a generally V-shaped sectional shape.

The outer panel may be made of resin that has a lower strength than the resin of which the inner panel and the outer edge outer panel are made.

Because the outer panel is made of resin that has a lower strength than the resin of which the inner panel and the outer edge outer panel are made, the outer panel has less of an effect on the deformation mode (fracture mode) of the vehicle exterior design member. Therefore, the deformation mode of the vehicle exterior design member is able to be determined mainly by the inner panel and the outer edge outer panel, so the deformation mode of the vehicle exterior design member is able to be easily set (designed).

The opening may be provided in at least one of the inner panel and the outer panel, and the opening may have another function or use in addition to weakening the boundary portion.

With this vehicle exterior design member, the opening provided in at least one of the inner panel and the outer panel is arranged adjacent to the boundary portion between the first outer edge portion and the second outer edge portion, so the boundary portion is weakened. Because this opening has a function or use other than weakening the boundary portion as described above (e.g., the opening may also serve as a window hole, a lamp mounting hole, a working hole, a drainage hole, a wiring hole, or a reference hole), it is not necessary to provide a special opening or the like to weaken the boundary portion.

The boundary portion may include a structural deformation that defines a starting point of deformation of the boundary portion.

When the structural deformation that defines the starting point of deformation of the boundary portion between the first outer edge portion and the second outer edge portion is provided on the boundary portion, the boundary portion can be made to deform with this structural deformation as the starting point, which further contributes to the stabilization of the deformation mode.

The inner panel may be a door inner panel of a back door of a vehicle, and the outer panel may be a door outer lower panel that is joined to a lower portion of the door inner panel. The first outer edge portion may include the reinforcing member connected to an upper edge portion, a left edge portion, and a right edge portion of a first window opening provided in an upper portion of the door inner panel. Left and right lower end portions of the first outer edge portion are positioned farther to a lower end side of the door inner panel than the first window opening and may each provide a boundary portion between the first outer edge portion and the second outer edge portion.

With this vehicle exterior design member, the door inner panel of the back door of the vehicle is made of resin. A resin door outer lower door panel is joined to the lower portion of this door inner panel, and a first window opening is provided in an upper portion of this door inner panel. The reinforcing member is connected to the upper edge portion, the left edge portion, and the right edge portion of this first window opening. Thus, the first outer edge portion that has a higher strength than the second outer edge portion is formed. The left and right lower end portions of this first outer edge portion are both boundary portions between the first outer edge portion and the second outer edge portion. These left and right boundary portions are arranged adjacent to an opening or weak portion provided in at least one of the door inner panel and the door outer lower panel. As a result, the left and right boundary portions are weakened. Therefore, when a rear end collision or the like occurs, the door inner panel tends to deform at or near the left and right boundary portions. These left and right boundary portions are positioned farther to the lower portion side of the door inner panel than the first window opening, so the door inner panel is able to be prevented from inadvertently deforming at the left and right edge portions or the like of the window opening.

The opening can be a second window opening in the door inner panel and is (i) smaller than the first window opening and (ii) provided extending between left and right lower end portions of the first outer edge portion.

Accordingly, the second window opening is provided between the left and right lower end portions of the first outer edge portion that are positioned farther to the lower end side of the door inner panel than the first window opening, i.e., extending between the left and right boundary portions between the first outer edge portion and the second outer edge portion, in the door inner panel. This second window opening improves the rear visibility of the vehicle. Moreover, because the left and right boundary portions are weakened by the second window opening that improves the rear visibility of the vehicle in this way, there is no need to provide a special opening or the like to weaken the left and right boundary portions.

A second aspect relates to a back door of a vehicle, the back door comprising: a door inner panel made of resin, the door inner panel having a first window opening and a second window opening, the second window opening being (i) elongated in a vehicle width direction, (ii) smaller than the first window opening, and (iii) located below the first window opening; a door outer lower panel made of resin, which is joined to the door inner panel below the second window opening; and a door outer upper panel that is made of resin and is joined to an upper edge portion, a left edge portion, and a right edge portion of the first window opening in the door inner panel. The door outer upper panel and the door inner panel form an enclosed chamber having left and right lower end portions arranged adjacent to left and right outer sides in the vehicle width direction of the second window opening.

With this back door, a second window opening that is elongated in the vehicle width direction, is smaller than the first window opening, and is provided below the first window opening, in the door inner panel made of resin, and the door outer lower panel made of resin is joined to the door inner panel below the second window opening. Also, the resin door outer upper panel and the door inner panel form an enclosed chamber around the upper edge portion, the left edge portion, and the right edge portion of the first window opening in this door inner panel. The left and right lower end portions of this enclosed chamber are arranged adjacent to left and right outer sides in the vehicle width direction of the second window opening. That is, the boundary portion (the left and right lower end portions) where the sectional structure changes is weakened by being adjacent to the second window opening. As a result, when a rear end collision or the like of the vehicle occurs, the door inner panel tends to deform at or near these left and right lower end portions, which contributes to the stabilization of the deformation mode.

The term "arranged adjacent" as used in this description means, for example, that the left and right lower end portions and the second window opening are arranged such that when the back door deforms at or near the left and right lower end portions described above, this deformation location reaches (extends) to at least the second window opening.

As described above, the vehicle exterior design member and the vehicle back door contribute to the stabilization of the deformation mode, in a structure in which an inner panel made of resin and an outer panel made of resin are joined together.

BRIEF DESCRIPTION OF THE DRAWINGS

Features, advantages, and technical and industrial significance of exemplary embodiments will be described below with reference to the accompanying drawings, in which like numerals denote like elements, and wherein.

DETAILED DESCRIPTION OF EMBODIMENTS

<First Example Embodiment>

Figure 1:
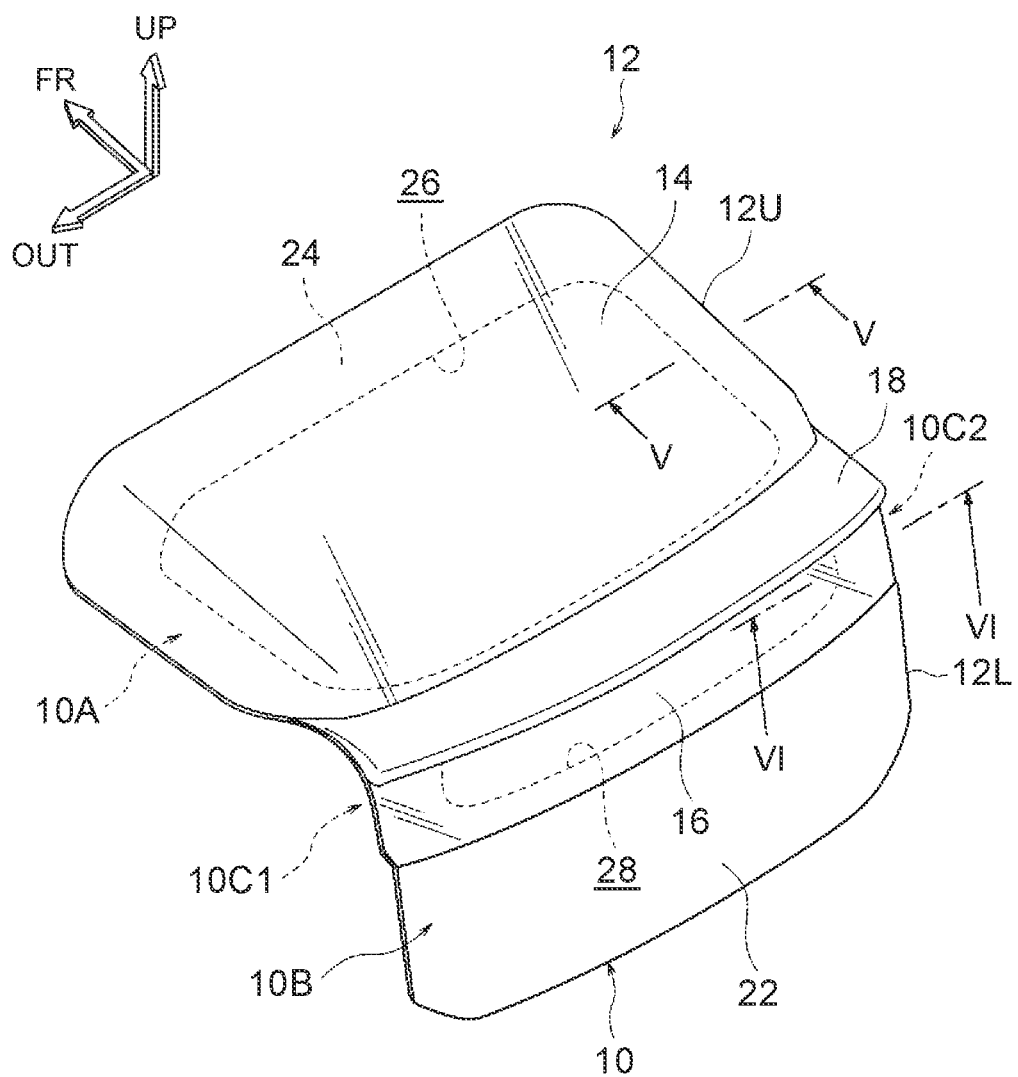
FIG. 1 is a perspective view of a back door of a vehicle according to a first example embodiment, viewed diagonally from the rear left.

Hereinafter, a back door main body 10 as a vehicle exterior design member according to a first example embodiment, and a vehicle back door (rear hatch) 12 of a vehicle that includes this back door main body 10, will be described with reference to FIGS. 1 to 7. In the drawings, arrow FR indicates a forward direction (advancing direction) with respect to a vehicle, arrow UP indicates an upward direction with respect to the vehicle, and arrow OUT indicates an outside in a vehicle width direction. Hereinafter, unless otherwise specified, when directions of front and rear, left and right, and up and down are used, they will refer to front and rear in a vehicle longitudinal direction, left and right in a vehicle lateral direction (i.e., the vehicle width direction), and up and down in a vehicle vertical direction, respectively.

(Structure)

FIG. 1 is a perspective view of the back door 12 according to the example embodiment viewed diagonally from the rear left. This back door 12 is a door (rear hatch) that opens and closes a back door opening, not shown, formed in a rear end portion of a vehicle body. An upper end portion of the back door 12 is hinge connected to the vehicle body with the vehicle width direction as the axial direction. Thus, the back door 12 is supported by the vehicle body so as to be able to open and close. The back door 12 is formed having a general L-shape when viewed from a side of the vehicle, and includes a door upper portion 12U that extends gently downward at an angle toward the rear of the vehicle from an upper end portion of the back door 12, and a door lower portion 12L that hangs down toward a vehicle lower side from a rear end portion of the door upper portion 12U.

This back door 12 has a back door main body 10 made of resin (see FIG. 2), a back door glass 14 as a window glass, a back door lower glass 16 (hereinafter, simply referred to as "lower glass 16") as a small window glass, and a rear spoiler 18. The back door glass 14 is arranged on the door upper portion 12U, and the lower glass 16 is arranged on an upper portion of the door lower portion 12L. The rear spoiler 18 is arranged between the back door glass 14 and the lower glass 16. The back door glass 14, the lower glass 16, and the rear spoiler 18 are all attached to the back door main body 10.

Figure 2:
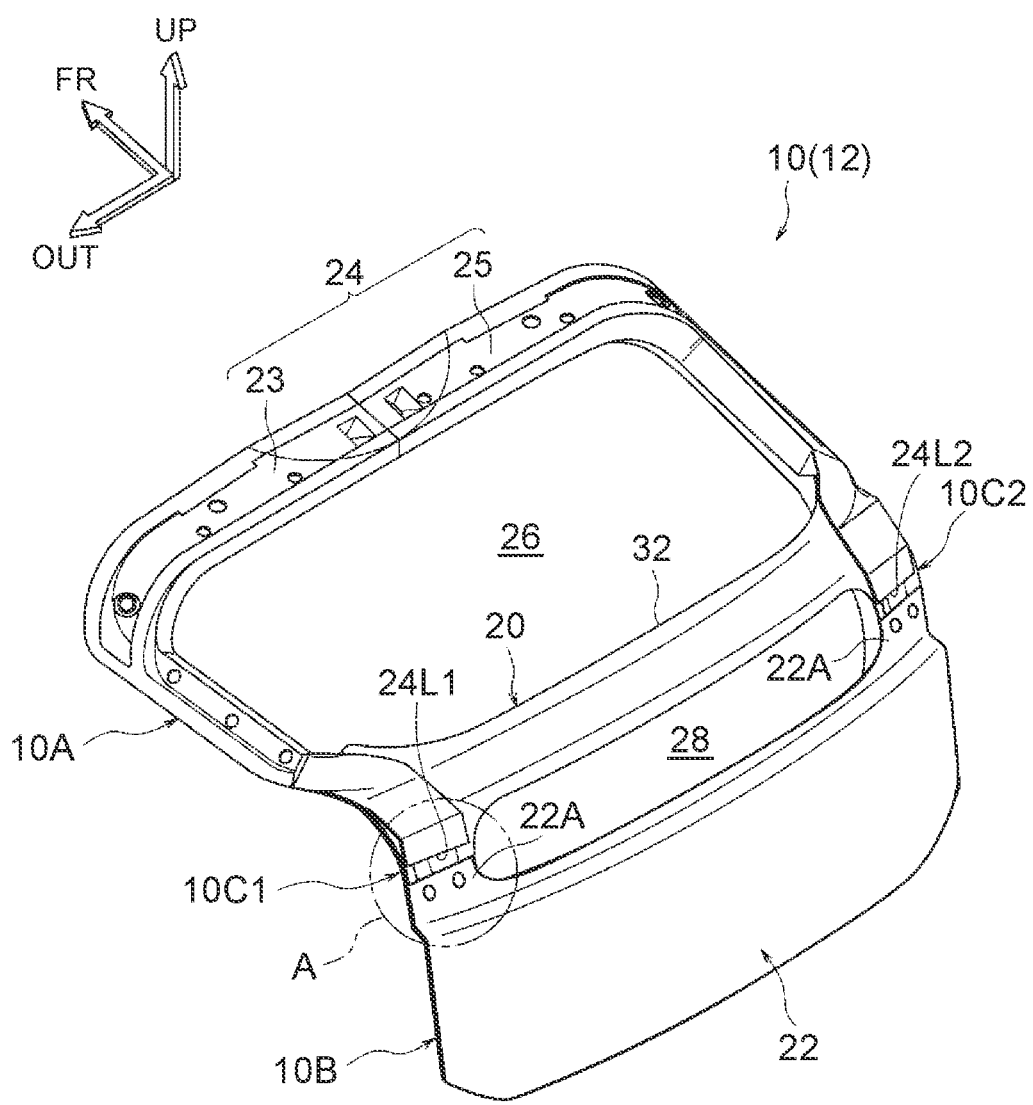
FIG. 2 is a perspective view of a back door main body of the back door before a back door glass and back door lower glass are mounted to the back door main body.

FIG. 2 is a perspective view of a back door main body 10 before the lower glass 16 and the rear spoiler 18 are attached to the back door main body. This back door main body 10 includes a door inner panel 20 made of resin, a door outer lower panel 22 made of resin that is joined to a lower portion of the door inner panel 20, and a door outer upper panel 24 made of resin that serves as an outer edge outer panel (reinforcing member) that is joined to an upper portion side of the door inner panel 20. Hereinafter, the door inner panel 20 will be referred to as the "inner panel 20", the door outer lower panel 22 will be referred to as the "outer lower panel 22", and the door outer upper panel 24 will be referred to as the "outer upper panel 24".

Here, the inner panel 20 and the outer upper panel 24 are made of CFRP (carbon-fiber-reinforced plastic) in which short carbon fibers are oriented randomly. Here, the outer lower panel 22 is made of polypropylene that is a resin having a lower strength than the CFRP described above. This outer lower panel 22 forms an appearance design surface of the vehicle and does not contribute much to the strength and rigidity of the back door main body 10. That is, the strength and rigidity of the back door main body 10 are mainly ensured by the inner panel 20 and the outer upper panel 24.

Figure 3:
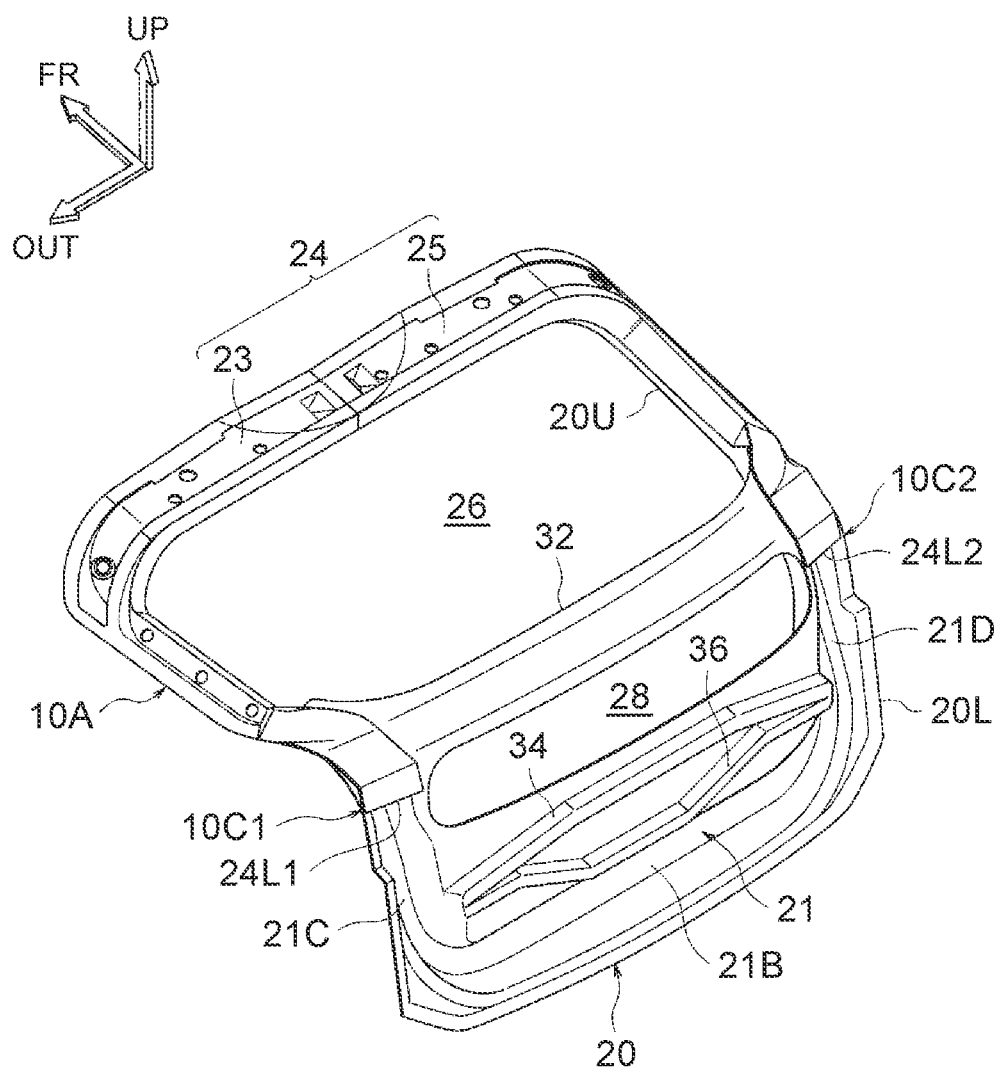
FIG. 3 is a perspective view of a door inner panel of the back door main body before a door outer lower panel is attached to the door inner panel.
Figure 4:
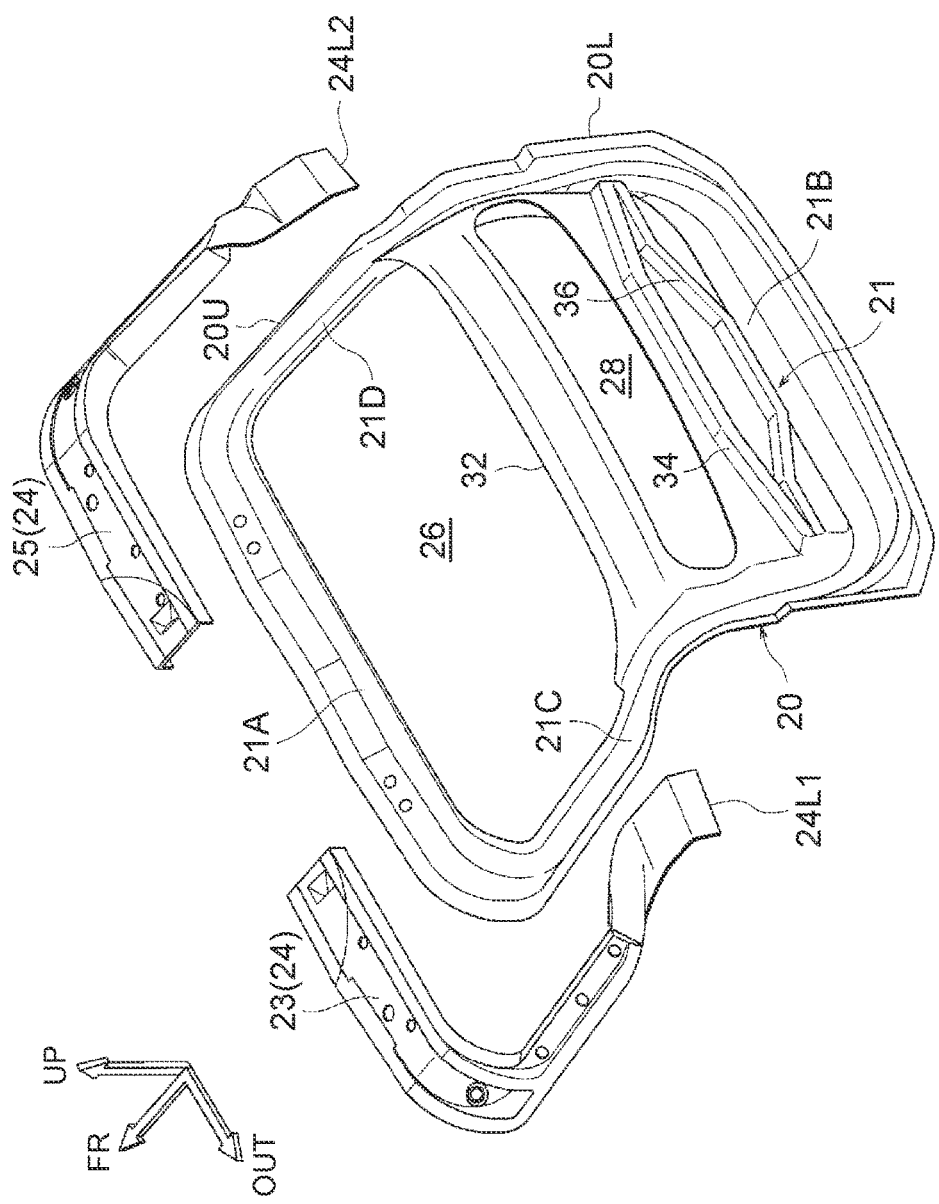
FIG. 4 is an exploded perspective view of the door inner panel and a door outer upper panel.

FIG. 3 is a perspective view of the inner panel 20 before the outer lower panel 22 is joined thereto, and FIG. 4 is a perspective view of the inner panel 20 before the outer lower panel 22 and the outer upper panel 24 are joined thereto. As shown in FIGS. 2 to 4, the inner panel 20 is a relatively large panel member that forms the main portion of the back door main body 10. An upper portion 20U of this inner panel 20 is arranged on the door upper portion 12U, and a lower portion 20L of the inner panel 20 is arranged on the door lower portion 12L.

A window opening 26 is formed in the upper portion 20U of the inner panel 20. This window opening 26 is formed in a long, generally rectangular shape that is long in the vehicle width direction. Also, a small window opening (a window hole) 28 that is more elongated than the window opening 26 is formed long in the vehicle width direction on an upper end side of the lower portion 20L of the inner panel 20, below the window opening 26. The window opening 26 and the small window opening 28 are openings for vehicle rear visibility, which are closed (covered) from the vehicle outside by the back door glass 14 and the lower glass 16.

An outer edge portion of the inner panel 20 is an open sectional portion 21 that has an open sectional shape that is open to the vehicle outside. This open sectional portion 21 includes an upper edge component 21A, a lower edge component 21B, a left edge component 21C, and a right edge component 21D that form the upper, lower, left, and right edge portions of the inner panel 20, and is formed along the entire periphery of the outer edge portion of the inner panel 20. This open sectional portion 21 improves the strength and rigidity of the inner panel 20.

The upper edge component 21A forms an upper edge portion of the window opening 26. The left edge component 21C and the right edge component 21D form the left and right edge portions, respectively, of the window opening 26 at the upper portion 20U of the inner panel 20, as well as form the left and right edge portions, respectively, of the small window opening 28 at the lower portion 20L of the inner panel 20. A center connecting portion 32 that extends in the vehicle width direction is formed near the vertically center portion of the inner panel 20, between the window opening 26 and the small window opening 28. The left edge component 21C and the right edge component 21D are integrally connected by this center connecting portion 32.

The center connecting portion 32 forms a lower edge portion of the window opening 26 and an upper edge portion of the small window opening 28.

A pair of upper and lower bulging portions 34 and 36 are formed in a vertically middle portion of the lower portion 20L of the inner panel 20. These bulging portions 34 and 36 are formed in open sectional shapes that are open on the vehicle inside (vehicle front side) when viewed from the vehicle width direction, and extend in the vehicle width direction below the small window opening 28. These bulging portions 34 and 36 improve the strength and rigidity of the vertically middle portion of the lower portion 20L of the inner panel 20.

The outer lower panel 22 described above is arranged on the vehicle outside (vehicle rear side) of the lower portion 20L of the inner panel 20. This outer lower panel 22 is joined to the inner panel 20 at predetermined locations on the outer edge portion and center side. The lower portion 20L of the inner panel 20 is covered from the vehicle outside by this outer lower panel 22. However, this outer lower panel 22 is arranged below the small window opening 28 so that the small window opening 28 is exposed to the vehicle outside. An upper protruding portion 22A that protrudes upward is formed on both left and right end portions of the upper edge portion of the outer lower panel 22.

The outer upper panel 24 described above is arranged on the vehicle outside (on the vehicle rearward inclined upper side) of the upper portion 20U of the inner panel 20. The outer upper panel 24 includes a left panel 23 and a right panel 25 that are formed split, as shown in FIG. 4. The left panel 23 and the right panel 25 are formed in general L-shapes and are bilaterally symmetrical, and are joined together by a production adhesive or the like in a state in which the edge portions on the vehicle width direction center side are overlapped with each other. As a result, the outer upper panel 24 is formed in an overall general U-shape that is open on the vehicle rear side.

This outer upper panel 24 is overlapped from the vehicle outside with the upper edge component 21A, the upper portion side of the left edge component 21C, and the upper portion side of the right edge component 21D, of the open sectional portion 21 of the inner panel 20. That is, the outer upper panel 24 is arranged on the vehicle upper side and both sides in the vehicle width direction, of the window opening 26. The back door main body 10 (the back door 12) according to this example embodiment is formed basically bilaterally symmetrical, so only a cross-section on the vehicle right side shown in FIGS. 5 and 6 will be described below. A description of a cross-section on the vehicle left side will be omitted, In the cross-section shown in FIG. 5 (i.e., the cross-section taken along line V-V in FIG. 1), the outer upper panel 24 includes an outer side upper wall portion 24A, an outer side side wall portion 24B, and an outer side inner wall portion 24C. The outer side upper wall portion 24A is arranged parallel or substantially parallel to the back door glass 14. The outer side side wall portion 24B is bent at a right angle or a substantially right angle in a direction away from the back door glass 14. The outer side inner wall portion 24C is bent at an obtuse angle toward the vehicle lower side from an end portion on the extending direction side of the outer side side wall portion 24B.

Figure 5:
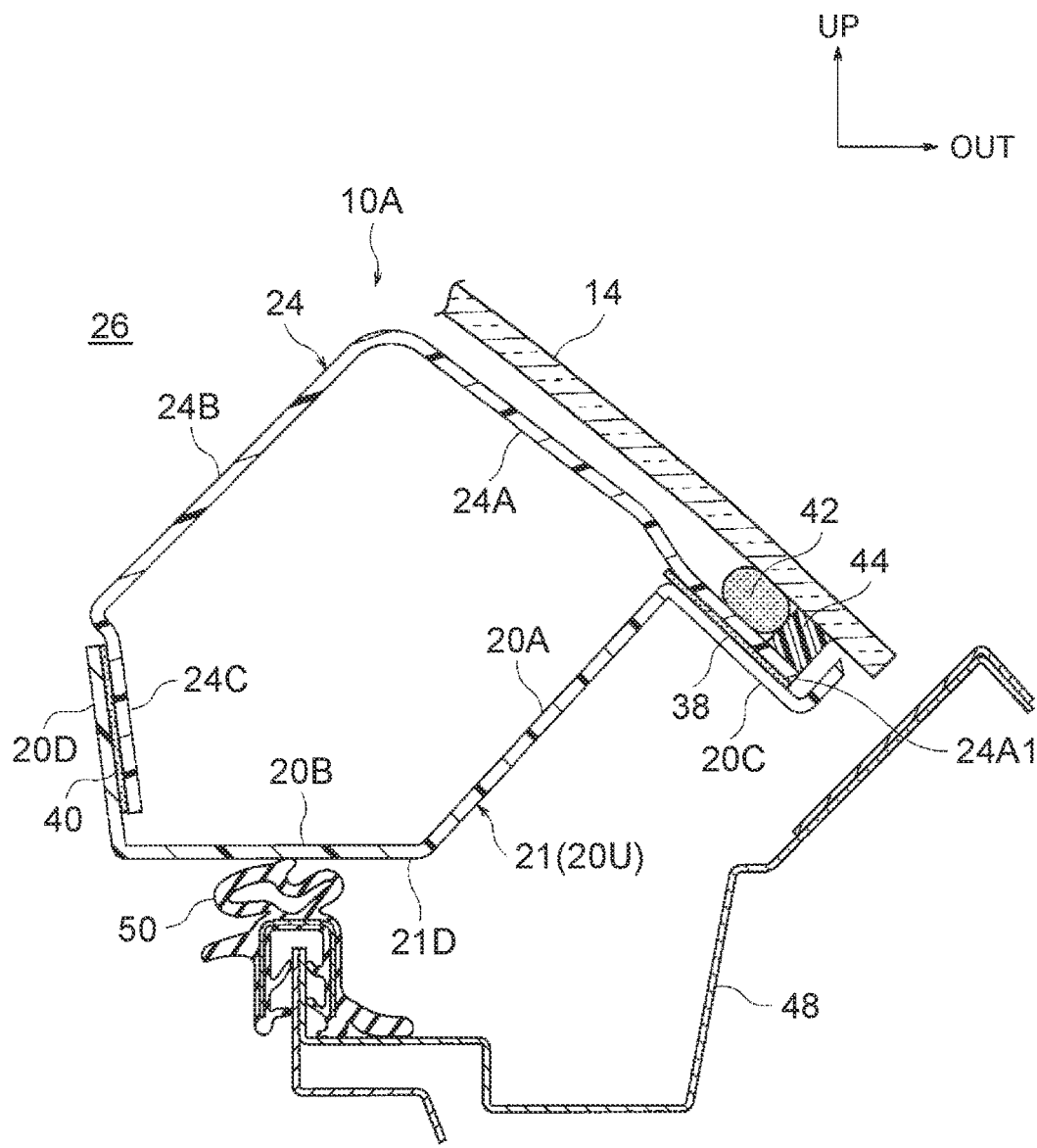
FIG. 5 is an enlarged sectional view of a cross-section taken along line V-V in FIG. 1.

Also, in the cross-section shown in FIG. 5, the open sectional portion 21 of the inner panel 20 includes an inner side outer wall portion 20A and an inner side bottom wall portion 20B. The inner side outer wall portion 20A is arranged farther toward the outside in the vehicle width direction than the outer side side wall portion 24B, and is parallel to the outer side side wall portion 24B. The inner side bottom wall portion 20B extends in an L-shape from an end portion on the vehicle lower side of the inner side outer wall portion 20A. The inner side outer wall portion 20A extends to the outer side upper wall portion 24A, and then bends toward the outside in the vehicle width direction and becomes an inner outside flange portion 20C. Moreover, the inner side bottom wall portion 20B extends to the outer side inner wall portion 24C, and then bends toward the vehicle upper side and becomes an inner side inside wall portion 20D.

A portion of the outer side upper wall portion 24A described above that is on the outer side in the vehicle width direction is an outer side flange portion 24A1. A lower surface of this outer side flange portion 24A1 is joined to an upper surface of the inner outside flange portion 20C by a production adhesive 38. Also, an inside surface in the vehicle width direction of the outer side inner wall portion 24C is joined to an outside surface in the vehicle width direction of the inner side inside wall portion 20D by a production adhesive 40. As a result, a closed section (a chamber) is formed by the outer upper panel 24 and a portion of the open sectional portion 21 of the inner panel 20.

Further, the back door glass 14 is joined to an upper surface of the outer side flange portion 24A1 by a peripheral component adhesive 42. This peripheral component adhesive 42 is set in a ring shape along the outer edge portion of the back door glass 14. A dam member 44 that is a water stopping member (a seal member) is arranged to the outside of the outer periphery of the peripheral component adhesive 42. This dam member 44 is set in a ring shape along the outer edge portion of the back door glass 14.

Figure 6:
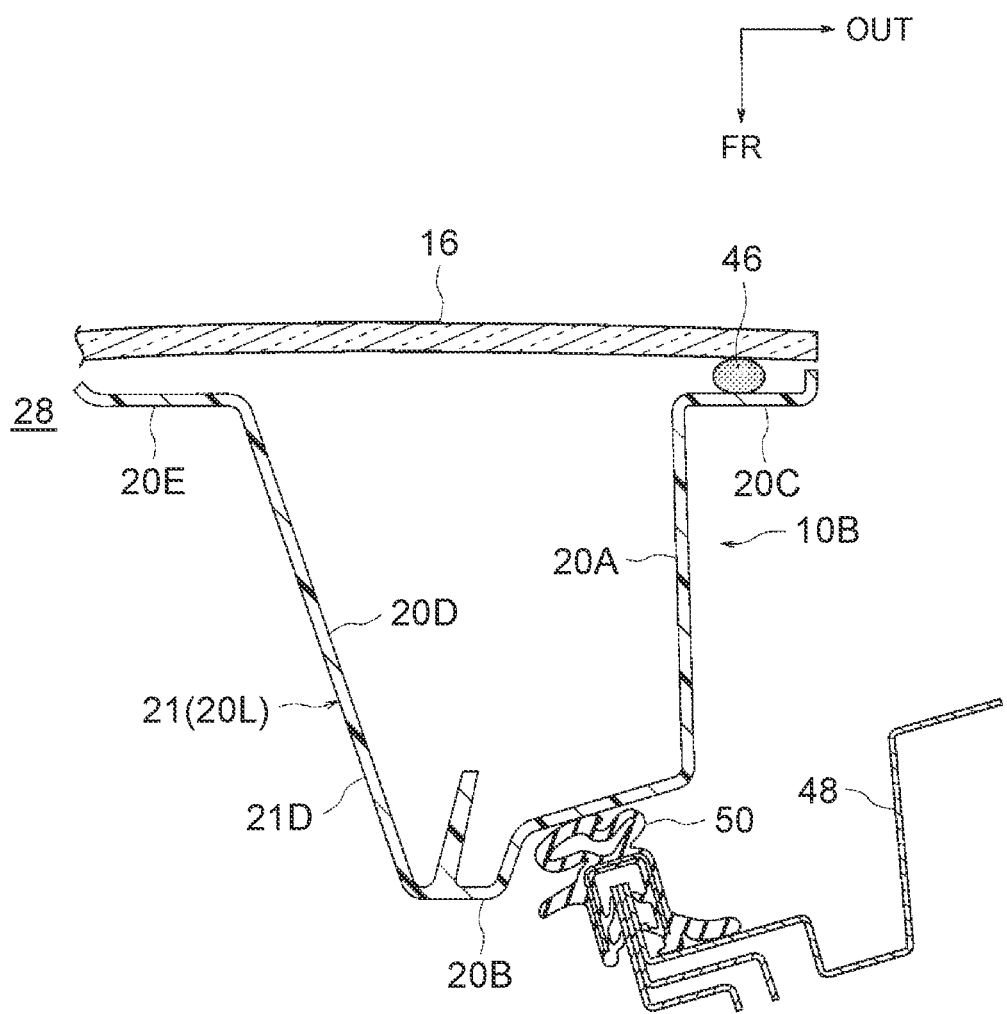
FIG. 6 is an enlarged sectional view of a cross-section taken along line VI-VI in FIG. 1.
Figure 7:
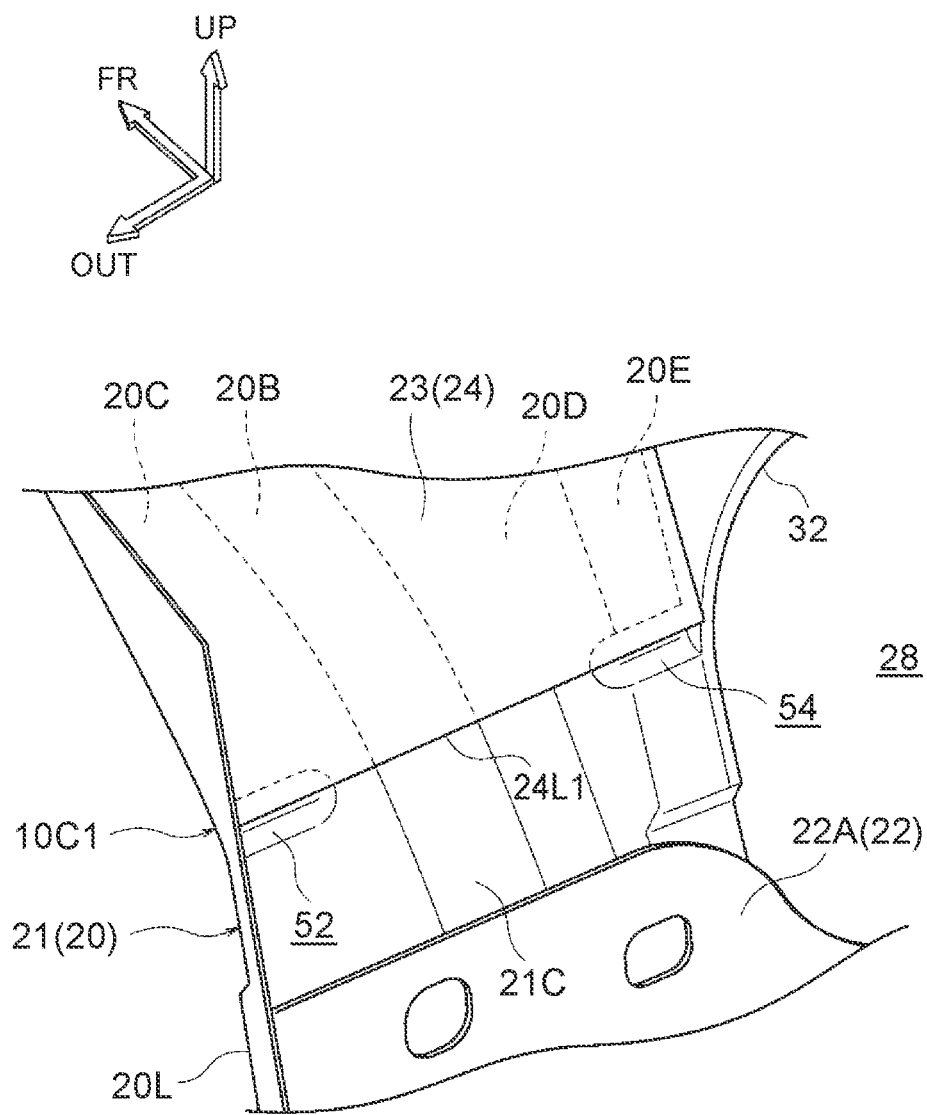
FIG. 7 is an enlarged sectional view of a region denoted by reference character A in FIG. 2.

The outer upper panel 24 described above is provided mainly on the upper portion 20U side of the back door main body 10, as shown in FIGS. 2 and 3. The outer upper panel 24 is not present in the cross-section shown in FIG. 6 (i.e., the cross-section taken along line VI-VI in FIG. 1). In the cross-section shown in FIG. 6, the open sectional portion 21 of the inner panel 20 includes the inner side outer wall portion 20A, the inner side bottom wall portion 20B, the inner outside flange portion 20C, and the inner side inside wall portion 20D described above. Moreover, an inner inside flange portion 20E extends toward the center side in the vehicle width direction from a rear end portion of the inner side inside wall portion 20D. The lower glass 16 is joined to a rear surface of the inner outside flange portion 20C by a peripheral component adhesive 46. This peripheral component adhesive 46 is set in a ring shape along the outer edge portion of the lower glass 16. As shown in FIGS. 5 and 6, when the back door 12 is closed, the inner side bottom wall portion 20B is abutted against a weather strip 50 that is attached to a vehicle body 48.

Of the back door main body 10 having the structure described above, a portion of the outer edge portion is a first outer edge portion (a high strength outer edge portion) 10A that is reinforced by the outer upper panel 24, and the other portion (the remaining portion) of the outer edge portion is a second outer edge portion (a low strength outer edge portion) 10B that is not reinforced by the outer upper panel 24. In the first outer edge portion 10A, the open sectional portion 21 of the inner panel 20 that is made of CFRP and the outer upper panel 24 that is made of CFRP are joined together to form a closed section. The strength and rigidity of the first outer edge portion 10A are improved by this closed section. This first outer edge portion 10A corresponds to a "closed sectional structural portion."

Meanwhile, in the second outer edge portion 10B, the outer upper panel 24 that is made of CFRP is not present, and the strength and rigidity of the second outer edge portion 10B is ensured mainly by the open sectional portion 21 of the inner panel 20. Therefore, the strength and rigidity of the second outer edge portion 10B are set lower than the strength and rigidity of the first outer edge portion 10A.

The first outer edge portion 10A is arranged on the vehicle upper side and both sides in the vehicle width direction, of the window opening 26, with the left and right lower end portions (rear end portions) being boundary portions 10C1 and 10C2 between the first outer edge portion 10A and the second outer edge portion 10B. These boundary portions 10C1 and 10C2 are positioned farther to the lower end side of the inner panel 20 than the window opening 26. The positions of these boundary portions 10C1 and 10C2 match the positions of the left and right lower end portions (rear end portions) 24L1 and 24L2 of the outer upper panel 24.

The outer upper panel 24 extends farther toward the upper end side of the lower portion 20L than the lower end (rear end) of the upper portion 20U of the inner panel 20, and the left and right lower end portions 24L1 and 24L2 are positioned on both sides of the small window opening 28 in the vehicle width direction. This small window opening 28 is formed extending between the left and right boundary portions 10C1 and 10C2, and the left and right boundary portions 10C1 and 10C2 are arranged adjacent to, on the outsides in the vehicle width direction of, the small window opening 28. The left and right lower end portions 24L1 and 24L2 of the outer upper panel 24 are arranged spaced apart, on the vehicle upper side, from the upper end portions of the left and right upper protruding portions 22A of the outer lower panel 22.

Also, a pair of left and right recessed portions 52 and 54 (see FIG. 7; not shown in the other drawings) that serve as deformation starting point portions are formed on each of the left and right boundary portions 10C1 and 10C2. These recessed portions 52 and 54 are formed by part of the inner outside flange portion 20C and part of the inner inside flange portion 20E of the open sectional portion 21 being formed depressed toward the vehicle front side, and have open sectional shapes (generally C-shaped sectional shapes) that are open on the vehicle rear side when viewed from the vehicle width direction. The recessed portions 52 and 54 are formed extending in the vehicle width direction, and are arranged lined up with each other in the vehicle width direction, and face the left and right lower end portions 24L1 and 24L2 of the outer upper panel 24 from the vehicle front side.

(Operation and Effects)

Next, the operation and effects of the example embodiment will be described.

With the back door 12 having the structure described above, the inner panel 20, the outer lower panel 22, and the outer upper panel 24 that form the back door main body 10 are all made of resin, so weight reduction is able to be achieved. However, when the back door main body 10 is made of resin in an attempt to reduce the weight, deformation in the plastic region of the resin is small, so with a collision in which a large load is applied such as a rear collision, cracking tends to occur. In particular, when fiber-reinforced resin in which the fibers are oriented randomly is used, the location where cracking will occur is difficult to predict. Therefore, from the viewpoint of stable occupant protection, it is important to take into consideration the stability of the deformation mode.

Regarding this, in this example embodiment, the outer edge portion of the back door main body 10 is formed by the first outer edge portion 10A on the vehicle upper side and the second outer edge portion 10B on the vehicle lower side. The first outer edge portion 10A is reinforced by the outer upper panel 24 that is joined to the inner panel 20, and thus has a higher strength than the second outer edge portion 10B. Also, the boundary portions 10C1 and 10C2 between the first outer edge portion 10A and the second outer edge portion 10B are arranged adjacent to the small window opening 28 formed in the inner panel 20.

In this way, the left and right boundary portions 10C1 and 10C2 that are the boundary portions between the first outer edge portion 10A and the second outer edge portion 10B where there is a strength difference, i.e., portions where the sectional structure of the outer edge portion of the back door main body 10 changes, are set at portions that are weakened by being adjacent to the small window opening 28. Therefore, when a rear end collision of the vehicle occurs, for example, stress concentrates near the left and right boundary portions 10C1 and 10C2 of the back door main body 10, so the back door main body 10 tends to deform (tends to break) at or near the left and right boundary portions 10C1 and 10C2, which contributes to the stabilization of the deformation mode. In addition, because the deformation mode is stabilized by the structure of the back door main body 10 based on the shape of the plurality of panels that are joined together, the deformation mode is able to be more effectively stabilized than it is with a structure in which the composite materials of individual panels are made to partially differ.

Also, in this example embodiment, the upper edge portion, the left edge portion, and the right edge portion of the window opening 26 in the inner panel 20 are reinforced by the outer upper panel 24, while the boundary portions 10C1 and 10C2, the positions of which are determined by the arrangement of the left and right lower end portions 24L1 and 24L2 of the outer upper panel 24, are positioned farther to the lower end side of the inner panel 20 than the window opening 26. As a result, the inner panel 20 will not inadvertently deform at the left and right edge portions and the like of the window opening 26.

That is, in this example embodiment, the position of the end portion of the outer upper panel 24 (the outer edge outer panel; a reinforcing member) is set to a portion that is weakened by being adjacent to the window opening 28, while reinforcing the portion where inadvertent deformation is predicted in the back door main body 10, with the outer upper panel 24. As a result, the planned deformation location of the back door main body 10 is able to be effectively specified.

Also, in this example embodiment, the first outer edge portion 10A forms a closed section by the resin outer upper panel 24 that is a reinforcing member being joined to the outer edge portion of the resin inner panel 20. As a result, the first outer edge portion 10A is able to be efficiently made stronger than it is when a metal reinforcement or the like is used as a reinforcing member, which contributes to a reduction in weight.

Further, in this example embodiment, the open sectional portion 21 that has an open sectional shape is formed on the outer edge portion of the inner panel 20, and a closed section of the first outer edge portion 10A is formed by the outer upper panel 24 and a portion (on the upper portion side) of the open sectional portion 21. In this way, the strength of the inner panel 20 is able to be increased by the open sectional portion 21 being formed on the outer edge portion of the inner panel 20, so the strength of the back door main body 10 is able to be ensured mainly by the inner panel 20. As a result, the degree of freedom in design of the outer lower panel 22 that forms the appearance design surface of the vehicle is able to be improved.

Further, in this example embodiment, the outer lower panel 22 is made of resin (polypropylene) that has a lower strength than the resin (CFRP) that the inner panel 20 and the outer upper panel 24 are made of, so the outer lower panel 22 has less of an effect on the deformation mode (fracture mode) of the back door main body 10. As a result, the deformation mode of the back door main body 10 is able to be determined by mainly the inner panel 20 and the outer upper panel 24, so the deformation mode of the back door main body 10 is able to be set (i.e., designed) easily.

Moreover, in this example embodiment, the small window opening 28 is formed between the left and right lower end portions of the first outer edge portion 10A positioned farther to the lower end side of the inner panel 20 than the window opening 26, i.e., between the left and right boundary portions 10C1 and 10C2 between the first outer edge portion 10A and the second outer edge portion 10B, in the inner panel 20. This small window opening 28 improves the rear visibility of the vehicle. In addition, the left and right boundary portions 10C1 and 10C2 are weakened by the small window opening 28 that improves the rear visibility of the vehicle in this way, so there is no need to form a special opening or the like for weakening the left and right boundary portions 10C1 and 10C2.

Furthermore, in this example embodiment, the pair of left and right recessed portions 52 and 54 that will be the starting points for deformation of the left and right boundary portions 10C1 and 10C2, are formed on these boundary portions 10C1 and 10C2. Stress concentrates at these recessed portions 52 and 54 when a rear end collision or the like occurs, so the left and right boundary portions 10C1 and 10C2 are able to deform with these recessed portions 52 and 54 as the starting points. More specifically, it is possible to promote the breaking of the left and right boundary portions 10C1 and 10C2 around a horizontal axis that passes through the left and right recessed portions 52 and 54, which contributes even more to the stabilization of the deformation mode of the back door main body 10.

As described above, in this example embodiment, as a method of stabilizing the deformation mode of the back door main body 10, the upper portion side of the outer edge portion of the back door main body 10 is made a high strength closed section, while the lower end side of this outer edge portion is made an open section. By creating a strength difference between the upper portion side and the lower portion side of the back door main body 10 in this way, the deformation mode is able to be stabilized by having the back door main body 10 deform at the boundary portions 10C1 and 10C2. Moreover, the left and right lower end portions 24L1 and 24L2 of the outer upper panel 24 that is necessary for forming the high strength closed section are set near the small window opening 28. Setting the position where the sectional structure changes near a weakened portion of the inner panel 20 in this way makes it possible to further stabilize the deformation mode.

<Supplemental Description of the First Example Embodiment>

In the first example embodiment described above, the recessed portions 52 and 54 as deformation starting point portions are formed on the inner panel 20 at the boundary portions 10C1 and 10C2, but the embodiments are not limited to this. The deformation starting point portions may also be holes or the like.

Also, in the first example embodiment described above, the boundary portions 10C1 and 10C2 are weakened by the small window opening 28 (i.e., the opening) for vehicle rear visibility, but the embodiments are not limited to this. That is, a special opening to weaken the boundary portions may also be set.

Also, in the first example embodiment described above, the outer lower panel 22 (i.e., the outer panel) is made of resin that has a lower strength than the inner panel 20 and the outer upper panel 24 (i.e., the outer edge outer panel), but the embodiments are not limited to this. That is, the resin of which each of the panels is made may also be changed as appropriate.

Also, in the first example embodiment described above, the open sectional portion 21 having an open sectional shape is formed on the outer edge portion of the inner panel 20, and the closed section of the first outer edge portion 10A is formed by the outer upper panel 24 (i.e., the outer edge outer panel) and a portion of the open sectional portion 21, but the embodiments are not limited to this. For example, a closed section of the first outer edge portion may also be formed by an outer edge outer panel having an open sectional shape being joined to an outer edge portion of an inner panel formed in a flat plate shape.

Also, in the first example embodiment described above, the first outer edge portion 10A forms a closed section by the outer upper panel 24 (i.e., the outer edge outer panel) being joined to the outer edge portion of the inner panel 20, but the embodiments are not limited to this. For example, an outer edge outer panel that has been strengthened by a plurality of ribs formed thereon may also be joined to the outer edge portion of the inner panel.

Moreover, in the first example embodiment described above, the boundary portions 10C1 and 10C2 are arranged adjacent to the small window opening 28 (i.e., the opening) formed in the inner panel 20, but the embodiments are not limited to this. That is, the boundary portions 10C1 and 10C2 may also be arranged adjacent to a weak portion formed on at least one of the inner panel 20 and the outer lower panel 22 (i.e., the outer panel). This weak portion need only be weaker than the surrounding portion, and may be a thin portion that is thinner than the surrounding portion, for example. Also, a flat plate portion (a weak portion) formed in a flat plate shape may be surrounded by a surrounding portion on which ribs or the like have been formed. The foregoing supplemental description is also the same for the example embodiments described below.

Next, other example embodiments will be described. Structure and operation that are basically the same as those in the first example embodiment will be denoted by the same reference characters used in the first example embodiment, and descriptions thereof will be omitted.

<Second Example Embodiment>

Figure 8:
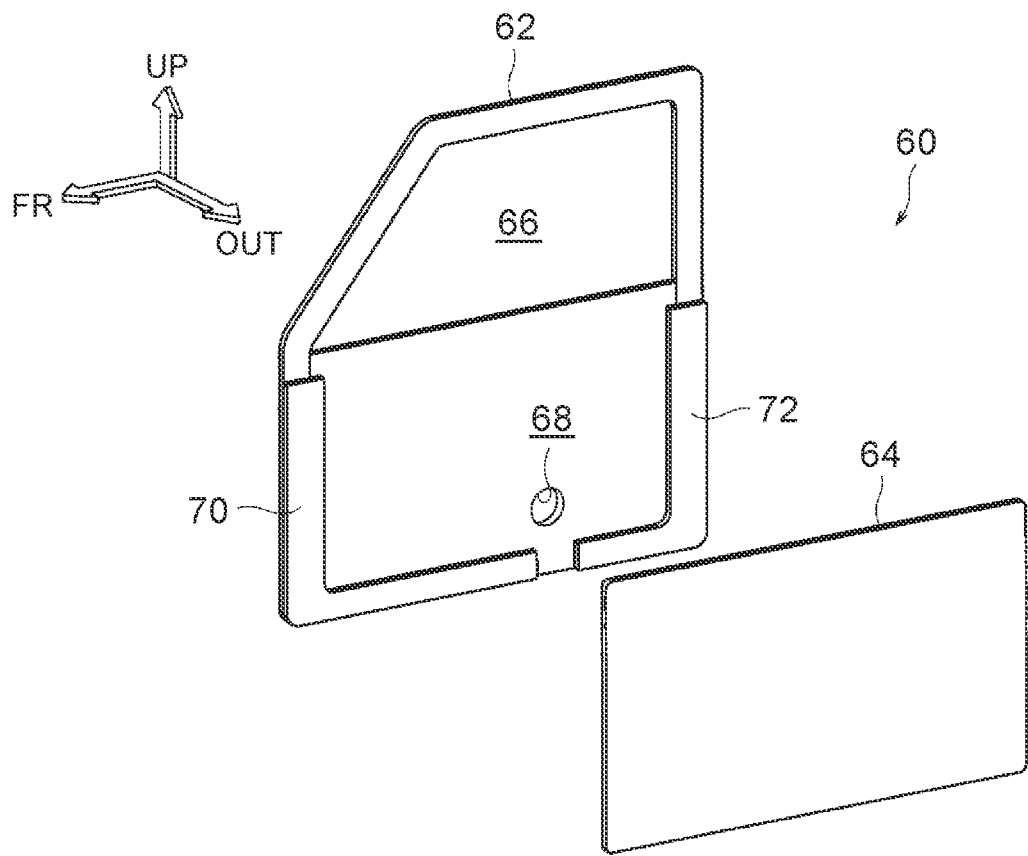
FIG. 8 is an exploded perspective view of a side door main body as a vehicle exterior design part according to a second example embodiment.
Figure 9:
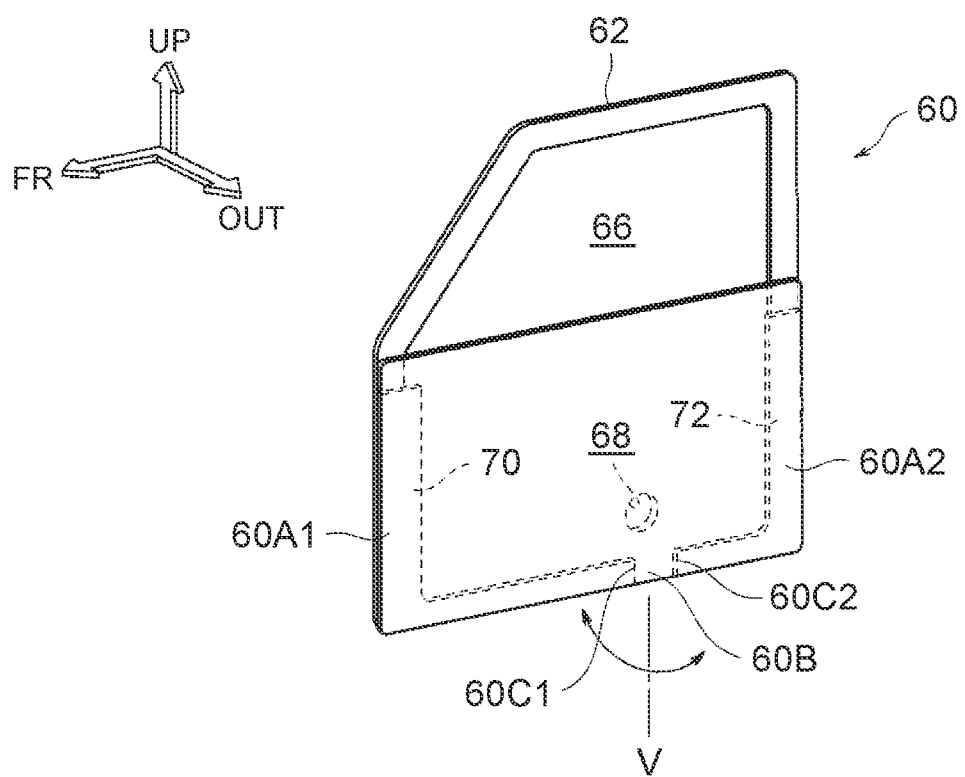
FIG. 9 is a perspective view of the side door main body.

FIG. 8 is an exploded perspective view of a side door main body 60 as a vehicle exterior design member according to a second example embodiment. Also, FIG. 9 is a perspective view of this side door main body 60. This side door main body 60 forms a main body portion of a side door of a vehicle, and includes an inner panel (a side door inner panel) 62, and an outer panel (a side door outer panel) 64 that is joined to an outside, in the vehicle width direction, of a lower portion of the inner panel 62.

A glass opening 66 that is closed off by a side door glass is formed in an upper portion of the inner panel 62. Also, an opening 68 that is sufficiently smaller than the glass opening 66 is formed in a portion that is slightly to the vehicle rear side of the center of a lower end portion of the inner panel 62 in the vehicle front-rear direction. This opening 68 is used as a working hole, a drainage hole, a wiring hole, or a reference hole or the like, for example.

Furthermore, this side door main body 60 includes a pair of front and rear outer edge panels (reinforcing members) 70 and 72 that are partially joined to an outer edge portion of a lower portion of the inner panel 62. These outer edge outer panels 70 and 72 are arranged between the inner panel 62 and the outer panel 64. The inner panel 62 and the outer edge panels 70 and 72 are made of resin (e.g., CFRP), and the outer panel 64 is made of resin (such as polypropylene) that has a lower strength than the inner panel 62 and the outer edge panels 70 and 72.

Each of the pair of front and rear outer edge panels 70 and 72 is formed in an L-shape. The front outer edge outer panel 70 is joined to the front edge portion of the lower portion, and the front portion side of the lower edge portion, of the inner panel 62. The rear outer edge outer panel 72 is joined to the rear edge portion of the lower portion, and the rear portion side of the lower edge portion, of the inner panel 62. Each of these outer edge panels 70 and 72 forms a closed section (a chamber) with the inner panel 62.

Of the side door main body 60 having the structure described above, portions of the outer edge portion are first outer edge portions (high strength outer edge portion) 60A1 and 60A2 that are reinforced by the outer edge panels 70 and 72, and the other portion of the outer edge portion is a second outer edge portion (a low strength outer edge portion) 60B that is not reinforced by the outer edge panels 70 and 72, as shown in FIG. 9. This second outer edge portion 60B is formed between the first outer edge portions 60A1 and 60A2, and has a lower strength than the first outer edge portions 60A1 and 60A2. The opening 68 described above is positioned above and near the second outer edge portion 60B. This opening 68 is arranged adjacent to each of a boundary portion 60C 1 between the first outer edge portion 60A1 and the second outer edge portion 60B, and a boundary portion 60C2 between the first outer edge portion 60A2 and the second outer edge portion 60B.

In this example embodiment as well, the boundary portions 60C1 and 60C2 between the second outer edge portion 60B and the first outer edge portions 60A1 and 60A2 where there is a strength difference are set at portions weakened by being adjacent to the opening 68. Therefore, when a side collision of a vehicle or the like occurs, stress concentrates near the boundary portions 60C1 and 60C2 of the side door main body 60, so the side door main body 60 tends to deform at or near these boundary portions 60C1 and 60C2. As a result, the deformation mode of the side door main body 60 is able to be stabilized such that the side door main body 60 breaks around the vertical axis V in FIG. 9.

<Third Example Embodiment>

Figure 10:
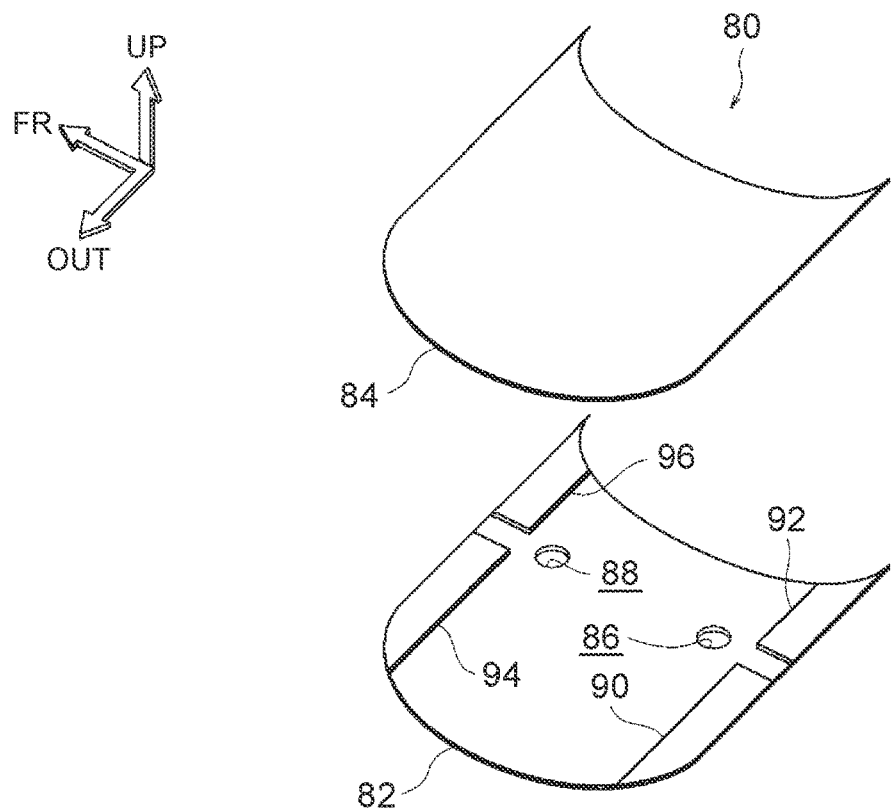
FIG. 10 is an exploded perspective view of a hood as a vehicle exterior design part according to a third example embodiment.
Figure 11:
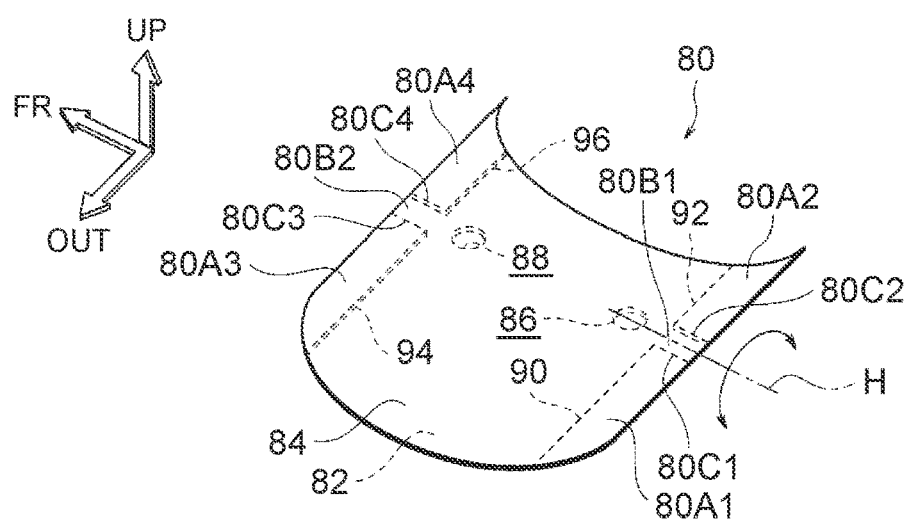
FIG. 11 is a perspective view of the hood.

FIG. 10 is an exploded perspective view of a hood 80 as a vehicle exterior design member according to a third example embodiment. Also, FIG. 11 is a perspective view of this hood 80. The hood 80 is used to open and close an upper end opening of a power unit compartment provided in a front portion of the vehicle, and includes an inner panel (a hood inner panel) 82 and an outer panel (a hood outer panel) 84 that is joined to an upper side of the inner panel 82.

Openings 86 and 88 are formed in positions slightly to the vehicle rear side of the center in the vehicle front-rear direction in left and right end portions, respectively, of the inner panel 82. These openings 86 and 88 are used as working holes, drainage holes, wiring holes, or reference holes or the like, for example.

Furthermore, this hood 80 includes a pair of front and rear outer edge outer panels (reinforcing members) 90 and 92 that are partially joined to a left edge portion of the inner panel 82, and a pair of front and rear outer edge outer panels (reinforcing members) 94 and 96 that are partially joined to the right edge portion of the inner panel 82. These outer edge outer panels 90, 92, 94, and 96 are arranged between the inner panel 82 and the outer panel 84. The inner panel 82 and the outer edge outer panels 90, 92, 94, and 96 are made of resin (e.g., CFRP), and the outer panel 84 is made of resin (e.g., polypropylene) that has a lower strength than the inner panel 82 and the outer edge outer panels 90, 92, 94, and 96.

The outer edge outer panel 90 is joined to a front portion side of a left edge portion of the hood 80, and the outer edge outer panel 92 is joined to a rear portion side of the left edge portion of the hood 80. Also, the outer edge outer panel 94 is joined to a front portion side of a right edge portion of the hood 80, and the outer edge outer panel 96 is joined to a rear portion side of the right edge portion of the hood 80. Each of these outer edge outer panels 90, 92, 94, and 96 forms a closed section (a chamber) with the inner panel 62.

Of the hood 80 having the structure described above, portions of the outer edge portion are first outer edge portions (high strength outer edge portions) 80A1, 80A2, 80A3, and 80A4 that are reinforced by the outer edge outer panels 90, 92, 94, and 96, and the other portions of the outer edge portion are second outer edge portions (low strength outer edge portions) 80B1 and 80B2 that are not reinforced by the outer edge outer panels 90, 92, 94, and 96, as shown in FIG. 11. The second outer edge portion 80B1 is positioned between the first outer edge portion 80A1 and the first outer edge portion 80A2, and the second outer edge portion 80B2 is positioned between the first outer edge portion 80A3 and the first outer edge portion 80A4. These outer edge portions 80B1 and 80B2 have a lower strength than the first outer edge portions 80A1, 80A2, 80A3, and 80A4.

The openings 86 and 88 described above are positioned near the centers of the left and right second outer edge portions 80B1 and 80B2 in the vehicle width direction. The opening 86 on the left side is arranged adjacent to both a boundary portion 80C1 between the first outer edge portion 80A1 and the second outer edge portion 80B1, and a boundary portion 80C2 between the first outer edge portion 80A2 and the second outer edge portion 80B1. Similarly, the opening 88 on the right side is arranged adjacent to both a boundary portion 80C3 between the first outer edge portion 80A3 and the second outer edge portion 80B2, and a boundary portion 80C4 between the first outer edge portion 80A4 and the second outer edge portion 80B2.

In this example embodiment as well, the boundary portions 80C1, 80C2, 80C3, and 80C4 between the first outer edge portions 80A1, 80A2, 80A3, and 80A4 and the second outer edge portions 80B1 and 80B2 where there is a strength difference are set at portions weakened by being adjacent to the openings 86 and 88. Thus, when there is a frontal collision or the like of the vehicle, stress concentrates near the boundary portions 80C1, 80C2, 80C3, and 80C4 of the hood 80, so the hood 80 tends to deform at or near these boundary portions. As a result, the deformation mode of the hood 80 is able to be stabilized such that the hood 80 breaks around a horizontal line H in FIG. 11.

The deformation positions of the side door main body 60 and the hood 80 in the second and third example embodiments are merely examples. Also, there may be cases in which it may actually be preferable not to apply the disclosed structure to a vehicle exterior design part such as the side door main body or the hood.

<Fourth Example Embodiment>

Figure 12:
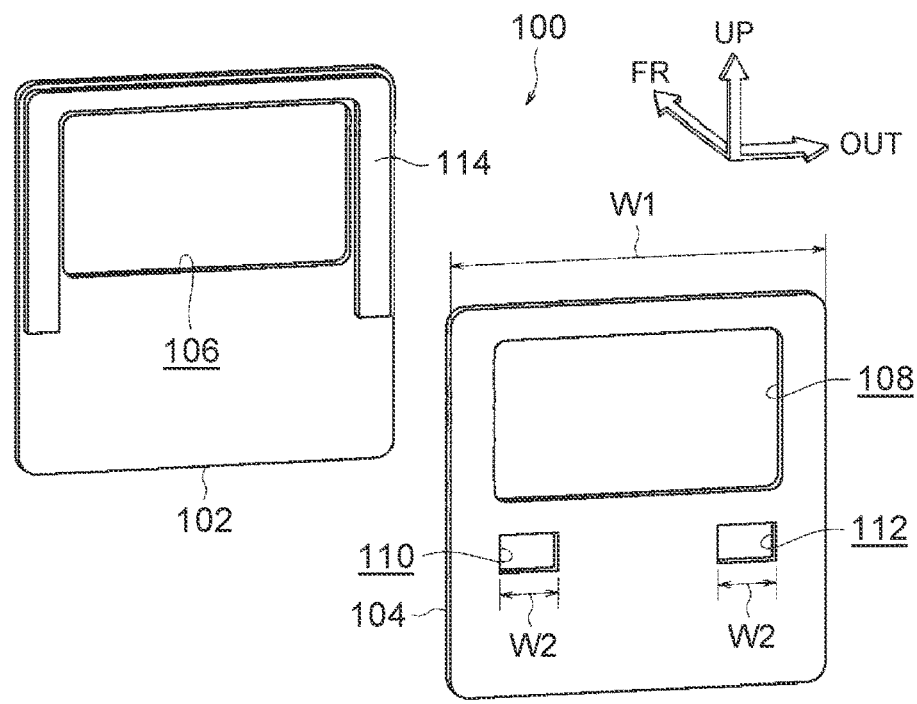
FIG. 12 is an exploded perspective view of a back door main body as a vehicle exterior design part according to a fourth example embodiment.
Figure 13:
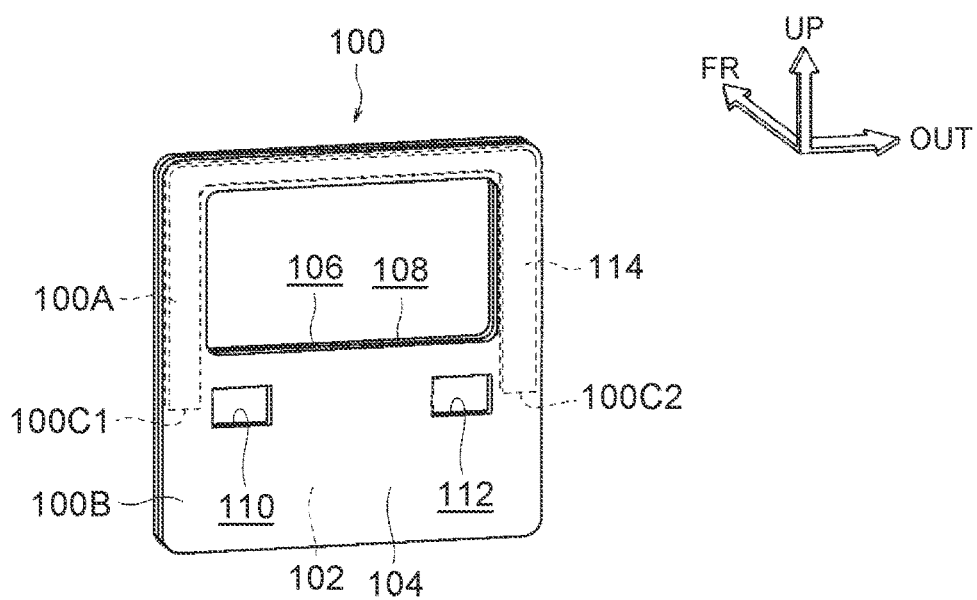
FIG. 13 is a perspective view of the back door main body.

FIG. 12 is an exploded perspective view of a back door main body 100 as a vehicle exterior design part according to a fourth example embodiment. Also, FIG. 13 is a perspective view of this back door main body 100. This back door main body 100 forms a main body portion of a back door of a vehicle, and includes an inner panel (a door inner panel) 102, and an outer panel (a door outer panel) 104 that is joined to a vehicle outside (vehicle rear side) of the inner panel 102. The inner panel 102 is made of resin (e.g., CFRP), and the outer panel 104 is made of resin (e.g., polypropylene) that has a lower strength than the inner panel 102.

Window openings 106 and 108 that are closed off by back door glass are formed in an upper portion of the inner panel 102 and the outer panel 104. Also, a pair of left and right openings 110 and 112 are formed in a vertically center portion of the outer panel 104 below the window opening 108. These openings 110 and 112 are lamp mounting holes for mounting lamps such as tail lamps to the outer panel 104. A dimension W2 in the vehicle width direction of each opening 110 and 112 is set to be equal to or greater than 1/10 of a dimension W1 in the vehicle width direction of the outer panel 104, for example. That is, the total width dimension W2 of the left and right openings 110 and 112 is set to equal to or greater than 1/5 of the width dimension W1 of the outer panel 104. Accordingly, the outer panel 104 is much weaker at the height where the openings 110 and 112 are formed.

Further, this back door main body 100 includes a metal reinforcement 114 as a reinforcing member. This reinforcement 114 is formed in a generally inverted U-shape that is open on the vehicle lower side, and is connected to an upper edge portion, an upper portion side of a left edge portion, and an upper portion side of a right edge portion of the inner panel 102. Any of various methods such as a bolted connection or adhesion may be applied as the connecting method of the reinforcement 114.

Of the back door main body 100 having the structure described above, a portion of an outer edge portion is a first outer edge portion (a high strength outer edge portion) 100A that is reinforced by the reinforcement 114, and the other portion (the remaining portion) of the outer edge portion is a second outer edge portion (a low strength outer edge portion) 100B that is not reinforced by the reinforcement 114. This second outer edge portion 100B has a lower strength than the first outer edge portion 100A.

The first outer edge portion 100A is arranged on a vehicle upper side, and on both sides in the vehicle width direction, of the window openings 106 and 108, and left and right lower end portions of the first outer edge portion 100A are boundary portions 100C1 and 100C2 between the first outer edge portion 100A and the second outer edge portion 100B. These boundary portions 100C1 and 100C2 are positioned farther to the lower end side of the inner panel 102 than the window openings 106 and 108, and are arranged adjacent to the left and right openings 110 and 112.

In this example embodiment as well, the boundary portions 100C1 and 100C2 between the first outer edge portion 100A and the second outer edge portion 100B where there is a strength difference are set at portions weakened by being adjacent to the openings 110 and 112. Thus, when there is a rear end collision or the like of the vehicle, stress concentrates near the boundary portions 100C1 and 100C2 of the back door main body 100, so the back door main body 100 tends to deform at these boundary portions 100C1 and 100C2. As a result, the deformation mode of the back door main body 100 is able to be stabilized.

Various modifications may be made to the described example embodiments, which are intended to be illustrative and not limiting.

What is claimed is:

1. A back door of a vehicle, the back door comprising:
a door inner panel made of resin, the door inner panel having a first window opening and a second window opening, the second window opening being located below the first window opening;
a door outer lower panel made of resin, which is a separate piece from the door inner panel, and is joined to the door inner panel below the second window opening; and
a door outer upper panel that is made of resin, which is a separate piece from the door outer lower panel and the door inner panel, and is joined to an upper edge portion, a left edge portion, and a right edge portion of the first window opening in the door inner panel,
wherein the door outer upper panel and the door inner panel form an enclosed chamber having left and right lower end portions arranged adjacent to left and right outer sides in a vehicle width direction of the second window opening, and a strength of the resin of the door outer lower panel is lower than a strength of the resin of the door inner panel and is lower than a strength of the resin of the door outer upper panel.

2. The back door according to claim 1, wherein the door inner panel includes a deformed portion located between the door outer lower panel and the door outer upper panel, and located adjacent to the left and right lower end portions of the enclosed chamber.

3. The back door according to claim 1, wherein the second window opening is elongated in the vehicle width direction.

4. The back door according to claim 3, wherein the second window opening is smaller than the first window opening.

5. The back door according to claim 1, wherein the second window opening is smaller than the first window opening.

6. The back door according to claim 1, wherein a gap is formed between a lower end of the door outer upper panel and an upper end of the door outer lower panel.

7. The back door according to claim 1, wherein the resin of the door inner panel is fiber-reinforced, and the resin of the door outer upper panel is fiber-reinforced.

8. A back door of a vehicle, the back door comprising:
a door inner panel made of resin, the door inner panel having a first window opening and a second window opening, the second window opening being located below the first window opening;
a door outer lower panel made of resin, which is a separate piece from the door inner panel, and is joined to the door inner panel below the second window opening; and
a door outer upper panel that is made of resin, which is a separate piece from the door outer lower panel and the door inner panel, and is joined to an upper edge portion, a left edge portion, and a right edge portion of the first window opening in the door inner panel, wherein
the door outer upper panel and the door inner panel form an enclosed chamber having left and right lower end portions arranged adjacent to left and right outer sides in a vehicle width direction of the second window opening, and a strength of the resin of the door outer lower panel is lower than a strength of the resin of the door inner panel and is lower than a strength of the resin of the door outer upper panel, gaps are formed between lower ends of the door outer upper panel and an upper end of the door outer lower panel, and the door inner panel includes deformed portions adjacent to the gaps between the upper end of the door outer lower panel and the lower ends of the door outer upper panel, and the deformed portions are located adjacent to the left and right lower end portions of the enclosed chamber.

9. The back door according to claim 8, wherein the gaps are located adjacent the left and right outer sides of the second window opening.

10. The back door according to claim 8, wherein the second window opening is elongated in the vehicle width direction.

11. The back door according to claim 10, wherein the second window opening is smaller than the first window opening.

12. The back door according to claim 8, wherein the second window opening is smaller than the first window opening.

13. The back door according to claim 8, wherein the resin of the door inner panel is fiber-reinforced, and the resin of the door outer upper panel is fiber-reinforced.

* * * * *